April 16, 1940.  K. E. BEMIS  2,196,968

DEEP-FAT FRYING MACHINE

Filed Dec. 7, 1938  2 Sheets-Sheet 1

Inventor
Kenneth E. Bemis
By Philip A. Friedell
Attorney

April 16, 1940.  K. E. BEMIS  2,196,968
DEEP-FAT FRYING MACHINE
Filed Dec. 7, 1938  2 Sheets—Sheet 2
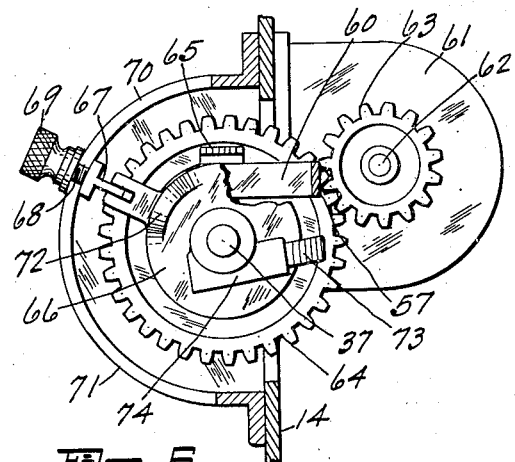
Fig. 6.
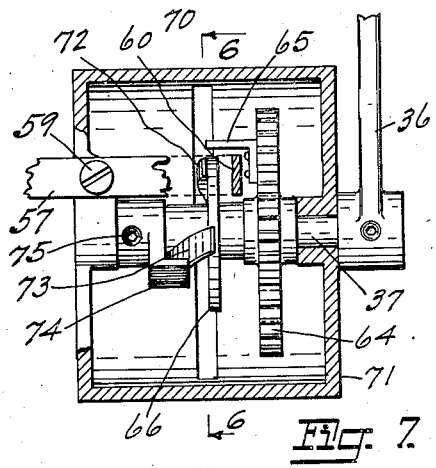
Fig. 7.
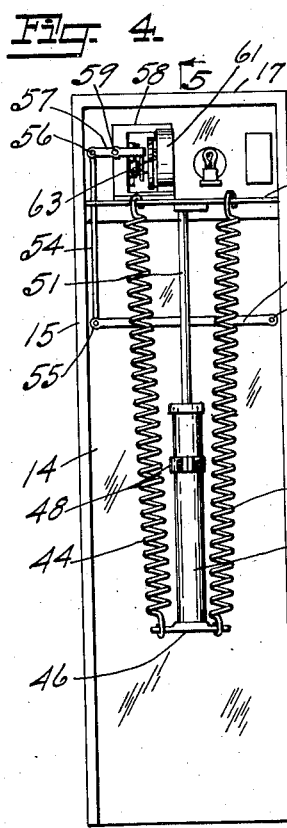
Fig. 4.
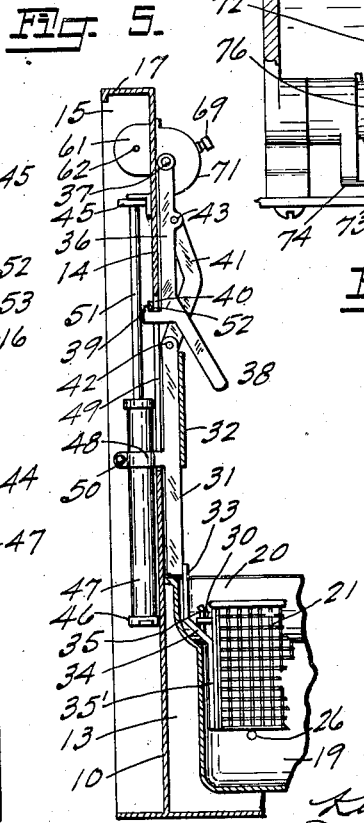
Fig. 5.
Fig. 8.
Inventor
Kenneth E. Bemis
By Philip A. Friedell
Attorney Patented Apr. 16, 1940

2,196,968

UNITED STATES PATENT OFFICE 2,196,968

DEEP-FAT FRYING MACHINE

Kenneth E. Bemis, Oakland, Calif.

Application December 7, 1938, Serial No. 244,450

25 Claims. (Cl. 161—16)

This invention, a potato cooking machine, is particularly designed for deep-fat frying of potatoes, such as the French-fried and shoestring varieties, although the machine is equally adaptable to the frying of doughnuts, crullers, chicken, and other foods which are adaptable to deep-frying methods.

In the usual process of frying shoestring or French-fried potatoes, the strips of potatoes are deposited in a pervious container, such as a basket, placed in a bath of hot fat and handled in accordance with the whims and fancies of the operator, or at his convenience, and thereby the different batches of potatoes, and those cooked by different operators vary in the time and temperature of cooking, resulting in non-uniform products.

This invention is designed to maintain a uniform temperature of bath, and to automatically time the cooking period, assuring products which are invariably uniform in character.

A cooker of similar character to produce similar results, but of somewhat different structure, is disclosed but not claimed in copending application, Serial No. 210,668, filed May 28, 1938, for Method of and means for deep-fat frying of foods, now U. S. Patent No. 2,177,166.

The principal object of this invention is to provide a deep-fat frying machine which is automatic in operation, both as to temperature control of the fat, and to timing of the cooking period and removal of the food from the fat.

Another object of the invention is to provide a timer of the mechanical type, which with its associated structure is simple and convenient to operate and economical in construction and positive in operation.

A further object of the invention is to provide a deep-fat frying machine which is compact, sanitary, and easily adjusted, controlled, and cleaned.

In describing the invention, reference will be had to the accompanying drawings, in which;

Fig. 4 is a rear view showing the operating and timing mechanism.

Fig. 5 is a section taken on line 5—5 of Fig. 4.

Fig. 6 is a section taken through the timing mechanism and corresponding to lines 6—6 of Figs. 2 and 7.

Fig. 7 is a view showing the interior construction of the timer, the cover being cut away and shown in section.

Fig. 8 is a top view of Fig. 7 with the upper portion of the housing removed and showing the operating parts from above.

Figure 3:
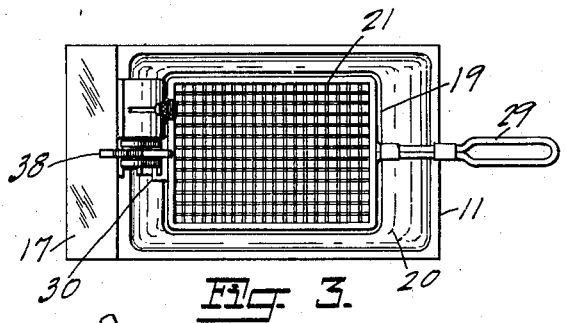
Fig. 3 is a top plan view of Fig. 1.

The cabinet consists of a rear wall 10, front wall 11 and side walls 12 and 13; the rear wall extending upwardly as indicated at 14 and having rearwardly extending flanges 15 and 16 and a cover 17, to form a housing for the operating and timing mechanism.

Sealed about the top of the pot housing as indicated at 18 is a pot, the body 19 of which is smaller than the head portion 20, and is adapted to receive the basket 21 while the enlarged portion 20 provides a bubbling and expansion chamber to prevent overflow of fat when the wet potato strips are first placed in the hot fat 22.

A drain plug 23 is provided for draining the fat from the pot at will, and the heating elements 24 and a sealed thermostatic switch and control element 25 projects into the bath of fat; and in a higher plane, cross bars 26 form supports for the basket 21.

The thermostatic element 25 controls a suitable switch (not shown), to maintain a uniform temperature of the bath 22, and the heating units 24 and the thermostatic element with its control switch are connected to a suitable supply of current, as through wires 27 and 28.

The basket 21 has a suitable handle 29 at one end and an eye 30 at its other end.

Figure 1:
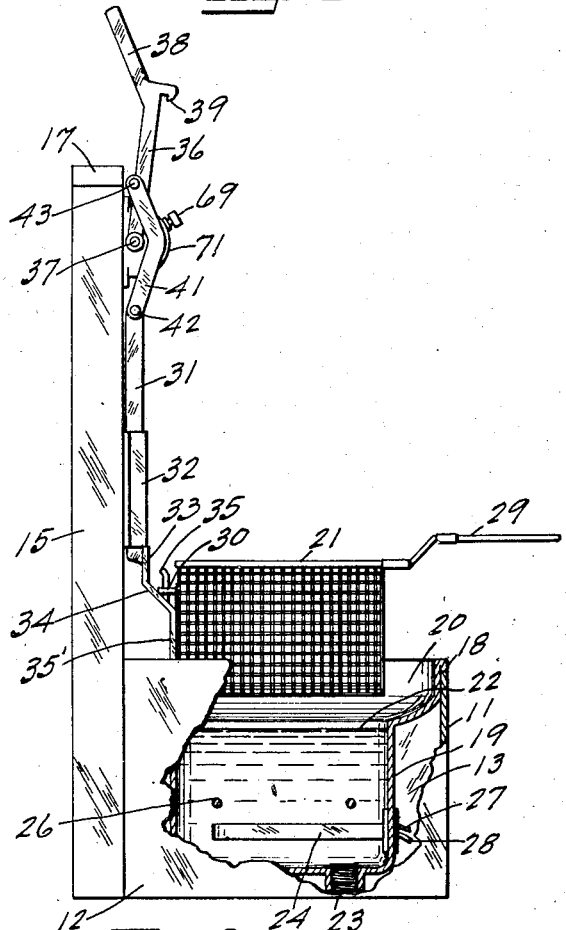
Fig. 1 is a side elevation of the invention with a portion shown in section to illustrate the interior construction.
Figure 2:
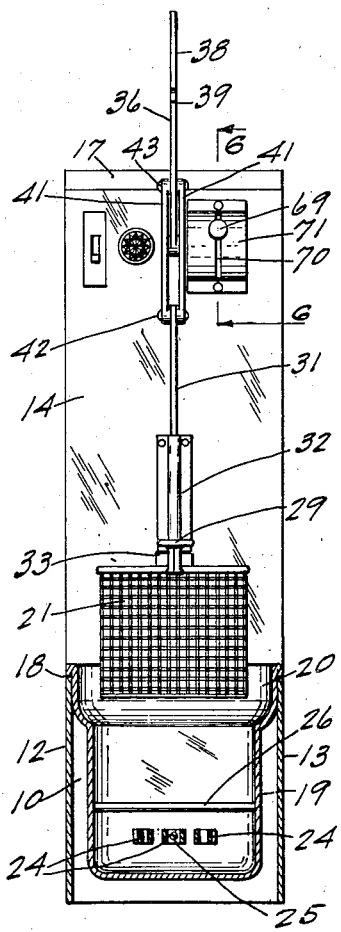
Fig. 2 is a front elevation of the invention.

The operating mechanism is normally disposed in the position shown in Figs. 1 and 2, and consists of a plunger or rod 31 slidably mounted in a bearing 32 which is mounted on the front panel 14. The lower end of the plunger 31 terminates in a plate 33 which is downwardly and forwardly inclined as indicated at 34 and which has an upstanding hook portion 35 for cooperation with the eye 30 for support of the basket 21, and a depending portion or fulcrum plate 35' is integral with this plate to form a rest for the lower portion of the back of the basket; the combination of hook 35, eye 30 and fulcrum plate 35 forming a rigid support supporting the basket 21 in a horizontal position as shown.

The setting lever 36 has one end fixed on the timer shaft 37 and has its other end formed into a handle 38; and a catch 39 is formed on this lever, and in the depressed position of the lever as shown in Fig. 5, this catch 39 projects through an opening 40 formed through the panel 14.

A pair of toggle links 41 connects between the upper end of the rod 31 at 42 and a point 43 intermediate the length of the lever 36, whereby, when the lever 38 is pulled down about its pivot 37 to the position shown in Fig. 5; the plunger 31 lowers the basket 21 into the bath of fat to the position illustrated in that figure.

The lifting means for the basket consists of a pair of tension springs 44 which have one end attached to a cross member 45 supported by the control housing, and the other end attached to the foot 46 of a pump cylinder 47. Arms 48 are integral with the plunger 31 and project through an opening 49 formed through the panel 14 and are secured to the cylinder 47 as by clamping, indicated at 50, and a piston operates within the cylinder and has a piston rod 51 which has its terminal end secured to the cross member 45, and the cylinder is supplied with a supply of fluid.

Due to the fact that when the lever 36 is depressed as shown in Fig. 5 the pivot 43 is forwardly of the plane passing through the axes of the pivots 37 and 42, a latch 52 is required to hold the lever in that position and retain the basket in its lowered position, since the urgence of the springs 44 would immediately raise the basket at a speed as controlled by the fluid check 47—51 as soon as the handle 38 was released.

The latch 52 has one end pivotally attached at 53 to the back of the front panel 14 and its other end pivotally connected to the release rod 54 as indicated at 55. Therefore, when the lever 38 is fully depressed, the catch 39 will engage the latch 52 and retain the basket 21 in its lowered position until the catch is released by lifting on the release rod 54 which has its upper end connected to one end 56 of a trigger 57 which is pivotally supported by the timer frame 58 at 59, and has its other end bent back as indicated at 60.

The timer includes a clock works 61 of the usual variety including a main spring and a train of gears but without balance wheel or escapement, and, the construction being well known in the art, no description is believed necessary. The type used and shown in the instant case is generally known as a five-minute timer. Other types may be substituted where greater or less range is required.

Fixed on the main shaft 62 of the timer clock is a pinion 63 which meshes with a gear 64 which in turn is rotatably mounted on the shaft 37 of the timer proper, and this gear 64 has a release finger 65 cooperatively related to the inturned portion 60 of the trigger 57.

Rotatably mounted on the shaft 37 next to the gear 64 is an adjusting plate 66, and this plate is rotatably adjustable by means of an indicating and adjusting arm 67 which is shown as securable in adjusted position by means of a screw 68 and nut 69, the screw passing through a slot 70 formed in the timer housing 71.

This plate 66 has a concentric cam surface 72 formed thereon for cooperation with a leaf spring 73 which has one end fixedly attached to the shoe 74 which is fixed on the shaft 37 as indicated at 75.

The operation of the invention is as follows: The potatoes or other foods are placed in the basket 21 which is then hooked onto the hook 30 by means of the eye 30. The lever 38 is then drawn forwardly and down and pressed back to the position shown in Fig. 5, permitting the latch 52 to engage the catch 39.

As the lever 38 is moved from the position shown in Fig. 1 to that shown in Fig. 5, it rotates the shaft 37 and with it the shoe 74. The spring 73 on this shoe engages the outer end 76 of the finger 65 and forces it with its gear 64 over and forward until the spring rides over the cam surface 72 which urges the spring away from the point 76, releasing the gear. The adjustment of 69 merely changes the relative position of this cam face 72 to provide for greater or less movement of the gear 64.

This gear 64 drives pinion 63 which through shaft 62 winds up the clock spring (not shown), and, as soon as the gear 64 is released, the clock spring drives the gear 63 and returns gear 64 toward its normal position, and according to the adjustment of the arm 67, the finger 65 eventually engages the inturned arm 60 of trigger 57, depressing the arm 60 and raising the end 56 of lever 57, the end 56 lifting the rod 54 and thus raising the latch 52 which is thereby released from the catch 39, and, due to the lack of alignment of the pivots 42, 43 and 37, the springs 44 force the lever 36 to its original or normal position while the fluid check 47 retards the movement, slowing it down to a sufficiently slow movement to remove the basket uniformly and slowly from the fat and without any tendency to splash.

As the lever 36 returns to its original position, the spring 73 is returned to its original position ready for re-engagement with the end 76 of the finger 65, ready for another operation.

In the copending application previously referred to, the operation and results are similar, the lift springs and check shown in Fig. 4 of the instant application being disclosed in the copending application, as also other features, however, electric means is disclosed in that application for timing, as also a fluid operated means for both, raising and lowering the basket. Therefore, the present application is in part a continuation of the cooker disclosed in the previous application.

It will be understood that variations in construction and arrangement of parts, which variations are consistent with the appended claims, may be resorted to without detracting from the spirit or scope of the invention, or sacrificing any of the advantages thereof.

I claim:

1. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said support for said basket comprising a plunger having a hook element, and having a depending fulcrum plate for cooperation with the lower portion of one wall of the basket; said basket having an eye at the upper end of said one wall for cooperation with said hook element for quick application and removal of the basket from the support and being rigidly supported in operative position through cooperation with said fulcrum plate.

2. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said retaining means including timing means comprising a clock works; a timer driven by said clock works; a latch cooperatively associated with said support in lowered position and controlled by said timer; driving means associated with said support winding said clock works when said support is being lowered, and releasing means associated with said timing means releasing said clock for self-operation and driving of said timing means when said support has been lowered to a predetermined degree; tripping means cooperating between said timing means and said latch releasing said latch when said clock works has returned to a substantially unwound condition.

3. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said pot having said heating means located in the lower portion thereof; supports located in a plane above said heating means for supporting said basket when lowered into said pot; said first mentioned support for said basket comprising a plunger having a hook element, and a depending fulcrum plate for cooperation with the lower portion of one wall of said basket; said basket having an eye at the upper end of said wall for cooperation with said hook element.

4. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; a housing; said manually controlled means including a lever pivoted at one end to said housing and having a handle formed at the other end; a pair of toggle links connecting between the upper end of said support and a point intermediate the ends of said lever, whereby movement of said lever from its raised to a lowered position depresses said support to lower the basket into said pot.

5. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; a housing; said manually controlled means including a lever pivoted at one end to said housing and having a handle formed at the other end; a pair of toggle links connecting between the upper end of said support and a point intermediate the ends of said lever, whereby movement of said lever from its raised to a lowered position depresses said support to lower said basket into said pot; said retaining means comprising a latch cooperatively related to said lever and supported by said housing, for latching said lever in its lowered position; said timing means being operatively associated with said latch to release said lever after said predetermined period of time.

6. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said means raising said basket comprising springs acting to raise said support, and a fluid check restraining the speed of raising movement and retarding the action of the springs; said retaining means comprising a clock works for driving said timing means; a latch cooperatively related to and engaging said manually controlled means in lowered position of the support and controlled by said timing means; driving means associated with said manually controlled means winding said clock works when said manually controlled means is being lowered, and means associated with said manually controlled means releasing said clock works for self-operation and driving of said timing means when said support has been lowered to a predetermined degree; means cooperating between said timing means and said latch releasing said latch when said clock works has returned to a substantially unwound condition.

7. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; a housing; cooperative attaching means associated with said plunger and with said basket providing rigid support of the basket on, and quick attachment and detachment thereof from the support; said manually controlled means including a lever pivoted at one end to said housing and having a handle formed at the other end; a pair of toggle links connecting between said support and a point intermediate the ends of said lever, whereby movement of said lever from its raised to a lowered position depresses said support to lower the basket into said pot; said retaining means comprising a latch cooperatively related to said lever and adapted to latch said lever in its lowered position; and said timing means being operatively associated with said latch to release said latch from said lever after said predetermined period of time.

8. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; a housing; said manually controlled means including a lever pivoted at one end to said housing and having a handle formed at the other end; a pair of toggle links connecting between said support and a point intermediate the ends of said lever, whereby movement of said lever from its raised to a lowered position depresses said support to lower said basket into said pot; said retaining means comprising a latch cooperatively related to said lever and adapted to latch said lever in its depressed position; said timing means being operatively associated with said latch to release said latch after said predetermined period of time; said means raising said basket comprising springs acting to raise said support, and a fluid check restraining the speed of raising movement and retarding action of the springs.

9. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; a housing; said manually controlled means including a lever pivoted at one end to said housing and having a handle formed at the other end; a pair of toggle links connecting between said support and a point intermediate the ends of said lever, whereby movement of said lever from its raised position to a lowered position depresses said support to lower said basket into said pot; said timing means comprising a clock works; a timer driven by said clock works; a latch cooperatively associated with said lever in lowered position and controlled by said timer; driving means associated with said lever winding said clock works as said lever is moved to a lowered position and means associated with said timer for releasing said clock works for self-operation and driving of said timer when said lever has been lowered to a predetermined degree and means manually adjustable and establishing said predetermined degree for releasing the clock works; means cooperating between said timer and said latch releasing said latch when said clock works has returned to a substantially unwound condition.

10. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said timing means comprising a timer having a shaft; a clock works; driving means on said shaft and operating to wind said clock works during depressive movement of said support, and means adjustable at will limiting the degree of winding during complete depression of said support and freeing said clock works for self-operation and for driving said timer when said degree of winding has been attained.

11. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said timing means comprising a timer having a shaft; a clock works having a pinion; a gear rotatable on said shaft and meshing with said pinion and an engaging finger projecting from one side of said gear; a shoe fixed on said shaft and having a spring finger cooperatively related to said engaging finger for driving said gear in one direction to wind said clock works; a cam plate interposed between said gear and said shoe and having a cam surface cooperatively related to said spring finger, and means for radially adjusting said cam surface; said cam surface operating to release said spring finger from said engaging finger to stop winding of said clock works; said engaging finger also operating to disengage said retaining means as the gear is driven back to its initial position by said clock works.

12. A deep-fat frying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said raising means comprising a fluid check having a cylinder having a foot and a piston rod with its terminal end fixedly supported and with the cylinder supported by said support, and springs cooperating with said foot and urging the cylinder to raise said support.

13. A timing device, in combination; a plunger and means manually operable for moving said plunger in one direction from its initial position to its terminal of travel, and retaining means retaining said plunger in its terminal position; a clock works, and means associated with said clock works and with said plunger and winding said clock works during a predetermined portion of the travel of said plunger and means manually adjustable and establishing said predetermined portion to establish the degree of winding of said clock works and releasing said clock works for self-operation and for driving said timer when said predetermined portion of travel has been attained; and means associated with said timer and with said retaining means releasing said plunger when said clock has returned to its initial substantially unwound condition; and means driving said plunger back to its initial position.

14. A structure as defined in claim 13 in which said means manually operable comprises a lever having a pivotal connection at one end and a handle formed at the other end; a link having pivotal connections to said plunger and to a point intermediate the length of said lever and in which the pivotal connection of the link to the lever is forwardly of the plane passing through the axes of the other two pivotal connections when the plunger is at its terminal of travel, whereby urgence of the plunger toward its initial position will urge to move the lever to its initial position and driven by said means driving when said plunger is released.

15. A deep-fat cooking machine comprising; a pot; a basket immersible in said pot; a plunger having supporting means at its lower end to suitably support said basket; a bearing for said plunger; a timer having a rotatable shaft; an operating lever having one end fixed on said shaft forming a pivotal connection, and having a handle formed at the other end; a toggle connection pivotally connecting said plunger and a point intermediate the length of said lever with the pivotal connection to said intermediate point displaced forwardly from a plane passing through the axes of the other two pivotal connections to assure breaking of the toggle system under urgence of the plunger; a catch on said lever and a latch cooperating with said catch when said lever and plunger are fully depressed; urging means urging raising of said plunger; and means associated with said shaft and with said latch, releasing said latch from said catch following a predetermined period of operation of said timer.

16. A structure as defined in claim 15 in which said timer comprises in combination with said shaft, a clock works; driving means on said shaft and operating to wind said clock works during depressive movement of said lever and means manually adjustable limiting the degree of winding during a complete depression of said lever and freeing said clock works for self-operation and for driving said timer when said degree of winding has been attained.

17. A structure as defined in claim 15 in which said timer comprises in combination with said shaft, a clock works having a pinion; a gear rotatable on said shaft and meshing with said pinion; an engaging finger projecting from one side of said gear; a shoe fixed on said shaft and having a spring finger cooperatively related to said spring finger for driving said gear in one direction; a cam plate interposed between said gear and said shoe and having a cam surface formed at one point on one of its side faces and cooperatively related to said spring finger, and means for rotatably adjusting said cam plate at will to vary the timing of said timer; said cam surface operating to release said spring finger from said engaging finger to stop winding of the clock works; said engaging finger operating to disengage said latch as said gear is driven back to its initial position by said clock works.

18. A structure as defined in claim 15 in which said urging means comprises a fluid check having a cylinder having a foot and a piston rod with its terminal end fixedly supported and with the cylinder supported by said plunger; and springs cooperating with said foot and urging the cylinder to raise said plunger.

19. A structure as defined in claim 15 in which said urging means comprises a fluid check having a cylinder having a foot and a piston rod with its terminal end fixedly supported and with the cylinder supported by said plunger; and springs cooperating with said foot and urging the cylinder to raise said plunger; and in which said timer comprises in combination with said shaft, a clock works; driving means on said shaft and operating to wind said clock works during depressive movement of said lever, and means manually adjustable limiting the degree of winding during a complete depression of said lever and freeing said clock works for self-operation and for driving said timer when said degree of winding has been attained.

20. A structure as defined in claim 15 in which said timer comprises in combination with said shaft, a clock works having a pinion; a gear rotatable on said shaft and meshing with said pinion; an engaging finger projecting from said gear; a shoe fixed on said shaft and having a spring finger cooperatively related to said spring finger for driving said gear in one direction; a cam plate interposed between said gear and said shoe and having a cam surface formed thereon and cooperatively related to said spring finger, and means for rotatably adjusting said cam plate to vary the timing of the timer; said cam surface operating to release said spring finger from said engaging finger to stop winding of the clock works; said engaging finger operating to disengage said latch as said gear is driven back to its initial position by said clock works; and in which said urging means comprises a fluid check having a cylinder having a foot and a piston rod with its terminal end fixedly supported and with the cylinder supported by said plunger; and springs cooperating with said foot and urging the cylinder to raise the plunger.

21. A deep-fat frying machine comprising a cabinet having a pot peripherally sealed therein and an operating mechanism housing having a front panel and extending upwardly from the rear of said cabinet; a container; a hand lever having one end pivotally mounted on said housing; a plunger vertically slidable and mounted on said front panel and having at its lower end attaching means for said container; and a toggle link having one end pivotally connected to the upper end of said plunger and its other end pivotally connected to said hand lever at a point between the ends thereof; depression of said hand lever lowering said basket into said pot.

22. A structure as defined in claim 21; raising and control means for said plunger comprising; a cylinder having a foot and a piston rod; arms integral with said plunger and projecting backwardly through an opening formed through said panel and fixedly attached to said cylinder, and tension springs having one end attached to said foot and the other end attached to said housing and urging to lift said cylinder and the plunger attached thereto; said piston rod being fixedly attached to said housing, whereby said springs raise said plunger and said container, and said cylinder controls the speed of raising of said plunger, and of said container out of said pot.

23. A structure as defined in claim 21; a catch integral with said hand lever and projecting through an opening formed in said panel when said lever is in its depressed position; a latch cooperatively related to said catch and forming retaining means for retaining said plunger in lowered position and said container lowered into said pot; and means for releasing said latch from said catch for releasing said plunger and its operating mechanism to permit raising of said container out of said pot.

24. A structure as claimed in claim 21; raising and control means for said plunger comprising a cylinder having a foot and a piston rod; arms integral with said plunger and projecting backwardly through an opening formed through said panel and fixedly attached to said cylinder, and tension springs having one end attached to said foot and the other end attached to said housing and urging to lift said cylinder and the plunger attached thereto; said piston rod being fixedly attached to said housing, whereby said cylinder controls the speed of raising of said basket out of said pot; a catch integral with said hand lever and projecting through an opening formed through said panel when said lever is in its depressed position; a latch cooperatively related to said catch and forming retaining means for retaining said basket in said pot; and timing means associated with said latch and controlling said latch to release said latch from said catch after a predetermined period of time following depression of said hand lever.

25. A deep-fat drying machine comprising; a pot and heating means therefor; a basket and a support therefor; manually controlled means associated with said support and operable to lower said basket into said pot; retaining means including timing means retaining said basket in its lowered position for a predetermined period of time; and means for raising said basket out of said pot when said predetermined period of time has elapsed; said manually controlled means including a lever movable to a lowered position; said retaining means comprising a latch cooperatively related to said lever and adapted to latch said lever in its lowered position; said timing means being operatively associated with said latch to release said lever after said predetermined period of time; said means for raising comprising springs acting to raise said support, and a fluid check restraining the speed of raising movement and retarding the action of the springs.

KENNETH E. BEMIS.